Patented Oct. 3, 1933

1,928,713

UNITED STATES PATENT OFFICE 1,928,713

LAMINATED MICA

Henry C. P. Weber, Edgewood, Pa., assignor to Westinghouse Electric & Manufacturing Company, a corporation of Pennsylvania No Drawing. Application November 17, 1927
Serial No. 234,052

6 Claims. (Cl. 154—2.6)

My invention relates to insulation material containing mica and more particularly to the so-called "built up" mica, which consists of plates or flakes of mica bonded together in layers by means of a resinous binder.

An object of my invention is to provide a composite or molded article from mica plates or flakes by the use of an improved binder which consists essentially of the reaction product of glycerol and phthalic anhydride, a plasticizer and an adhesive agent.

Another object of my invention is to provide a new composition of matter that is useful for the production of molded articles and particularly of molded articles utilized as electrical insulation.

It has heretofore been the practice to produce electrical insulation from mica flakes or plates and to bind them together by means of a resinous composition, such as shellac or a composition of shellac and other resins. Shellac, however, has not been entirely satisfactory for this purpose, because it softens at a comparatively low temperature and decomposes as the temperature increases, decomposition taking place rapidly at temperatures between 175 and 200° C.

Recently, attempts have been made to utilize the synthetic resin produced by the condensation of a polyhydric alcohol and a polybasic acid as a bonding agent for mica compositions, as such resins have high dielectric qualities and do not soften in their final state under the influence of heat. In making insulation plates in this manner, however, it has been impractical to reshape the articles after the resin has been rendered infusible and insoluble. Mica plates bound together by a resinous composition of the type described are not thermoplastic enough when properly cured to yield sufficiently so that they may be assembled as a part of electrical machinery or other equipment. When the bond has been properly cured and rendered infusible by heat or other means during the building of the mica sheet, excessive and impractically high temperatures are necessary to reshape the sheet. When the resin has not been properly cured, it lacks sufficient adhesive power, so that in heating a composite plate of the laminated insulation and shaping it—for instance, rolling it into a tube— the laminations separate, and a loose, unsatisfactory article is produced.

I have made the discovery that when a plasticizer and an adhesive substance are added to the bond, the difficulty mentioned will be overcome, and a satisfactory bond may be obtained which will yield sufficiently at high temperatures, so as to permit shaping of the mica flakes, and which is adhesive enough, so that while the material is being shaped or rolled, the laminations will not separate.

In practicing my invention, the plasticizer and adhesive agent are incorporated with the glycerol phthalate ester while it is in the fusible state, or with the initial components of the ester, and the composition may be applied to the mica flakes as a powder or in the form of a solution. The binder may be sifted or sprayed on the mica plates while they are being built up in the form of laminated sheets, or, if a solution is employed, the sheet may be formed by first superimposing the mica plates upon each other and then impregnating the composite sheet with a solution of the binder. When a solution of the binder is used, the solvent is subsequently eliminated by evaporation.

Composite sheets thus formed are heated in a press to polymerize and partially harden the binder, but before the product becomes infusible, they are machined to the proper shape and size. The developed sheets are next manually formed, placed in molds which have been heated to about 250° and put into a press which gives the mica its final form. The molds and developed sheets are then placed in an oven which is maintained at a temperature up to 250° C., whereupon the polymerization of the ester is continued under pressure, forming a hard, infusible resin which binds the mica plates together into a composite sheet of insulation, the polymerized resin serving to hold the mica plates together to form a dense, strong insulation. The molds are then taken out of the oven and again placed in a press and held under pressure until cooled off either by the natural loss of heat or by artificial cooling.

Any of the well-known plasticizers, such as diphenyl ether, triphenyl or tricresyl phosphate, camphor or halogenated naphthalenes, and an adhesive agent, such as petroleum or stearine pitch, pine tar, mucilaginous or gelatinous material, such as glue, or gum arabic, may be incorporated in the ester to form the binder. They may be used in varying proportions, but it has been found that if the plasticizer and adhesive agents are added in amounts ranging from 5 to 10% of the mixture, the final product will have the desired plasticity and adhesiveness.

The resulting article is mechanically stronger and is capable of being heated to a higher temperature than a composite plate of insulation produced by the use of shellac as a binder and is considerably superior in physical properties to articles made with a glycerol phthalate binder alone, as the binder is sufficiently thermoplastic to permit the article to be properly shaped during assembly as part of electrical machinery and is sufficiently adhesive so that the laminations will not separate during the shaping and molding operations.

While I have described the addition of a plasticizer and an adhesive agent to glycerol phthalate as being especially adaptable as a binder for mica flakes to form a composite plate of insulation, my invention is not limited in this respect, as such ingredients may also be used in conjunction with other resins formed by the reaction of a polyhydric alcohol and a polybasic acid or by the reaction of a polyhydric alcohol and a mixture of a polybasic acid and a monobasic acid, and especially with those resins mentioned in my copending application, Serial No. 234,053, filed on November 17, 1927, which is assigned to the Westinghouse Electric & Manufacturing Company. It will be understood that, if desired, a mixture of one or more of the plasticizers and adhesive agents may be used, without departing from the spirit of my invention.

Other modifications will be apparent to those skilled in the art and I desire, therefore, that only such limitations be placed upon my invention as are imposed by the prior art and the appended claims.

I claim as my invention:

1. A laminated structure comprising flakes of mica superimposed upon each other and secured together by a binder comprising the reaction product of a polyhydric alcohol and a polybasic acid, a plasticizer and adhesive agent, the adhesive agent being present in an amount not greater than 5% to 10% of the mixture.

2. A laminated structure comprising flakes of mica superimposed upon each other and secured together by a binder comprising the reaction product of glycerol and phthalic anhydride, an aromatic phosphate plasticizer and an adhesive agent.

3. A laminated structure comprising flakes of mica superimposed upon each other and secured together by a binder comprising the reaction product of glycerol and phthalic anhydride, tricresyl phosphate and glue.

4. A laminated structure comprising flakes of mica superimposed upon each other and secured together by a binder comprising the reaction product of glycerol and phthalic anhydride, an aromatic phosphate plasticizer and an adhesive agent, the adhesive agent being present in an amount sufficient to insure adhesion of the mica flakes.

5. A laminated structure comprising flakes of mica superimposed upon each other and secured together by a binder comprising the reaction product of glycerol and phthalic anhydride, an aromatic phosphate plasticizer and glue, the glue being present in an amount not greater than 5% to 10% of the mixture.

6. A laminated structure comprising flakes of mica superimposed on each other and secured together by a binder comprising a resin produced by the condensation of a polyhydric alcohol and a polybasic acid, a plasticizer, and from 5 to 10 percent of material selected from a group consisting of pitch pine tar, glue, and gum arabic.

HENRY C. P. WEBER.